US009421834B2

(12) United States Patent
Gonzaga et al.

(10) Patent No.: US 9,421,834 B2
(45) Date of Patent: Aug. 23, 2016

(54) DEVICE FOR FEEDING A FLUID TO A VESSEL TO BE FILLED (71) Applicant: Butler Engineering & Marketing S.p.A., Rolo (Reggio Emilia) (IT)

(72) Inventors: Tullio Gonzaga, Correggio-Reggio Emilia (IT); Silvano Santi, Imola-Bologna (IT)

(73) Assignee: BUTLER ENGINEERING AND MARKETING S.P.A., Rolo (Reggio Emilia) (IT)

( * ) Notice: Subject to any disclaimer, the term of this patent is extended or adjusted under 35 U.S.C. 154(b) by 155 days.

(21) Appl. No.: 14/137,240

(22) Filed: Dec. 20, 2013

(65) Prior Publication Data
US 2014/0182704 A1 Jul. 3, 2014

(30) Foreign Application Priority Data

Dec. 20, 2012 (IT) .............................. VR2012A0246
May 22, 2013 (IT) .............................. VR2013A0121

(51) Int. Cl.
*F16K 15/20* (2006.01)
*B60C 29/06* (2006.01)
*B60C 23/00* (2006.01)

(52) U.S. Cl.
CPC ........... *B60C 29/068* (2013.04); *B60C 23/003* (2013.01); *Y10T 137/36* (2015.04)

(58) Field of Classification Search
CPC ........... Y10T 137/2559; Y10T 137/36; Y10T 137/7762; Y10T 137/7769
USPC .................................................. 152/415, 416
See application file for complete search history.

(56) References Cited

U.S. PATENT DOCUMENTS 4,905,742 A * 3/1990 Mohs ...................... B60S 5/043
137/224.5
5,429,167 A 7/1995 Jensen

FOREIGN PATENT DOCUMENTS

DE 3246601 A1 6/1984
DE 102011017118 A1 10/2012
EP 0365953 A2 5/1990
GB 1580240 A 11/1980

OTHER PUBLICATIONS

International Search Report for International Application No. IT VR20120246 dated Aug. 14, 2013.

* cited by examiner

*Primary Examiner* — R. K. Arundale
(74) *Attorney, Agent, or Firm* — Tutunjian & Bitetto, P.C.

(57) ABSTRACT

The present invention relates to a device for feeding a fluid to a vessel (T), including a fluid inflow or inlet opening, a distribution valve placed between the inlet opening and the vessel (T), a fluid supply line between the distribution valve and the vessel, and a valve member intercepting the supply line and movable between a first position and a second position.

25 Claims, 5 Drawing Sheets

Prior Art

DEVICE FOR FEEDING A FLUID TO A VESSEL TO BE FILLED

CROSS REFERENCE TO RELATED APPLICATIONS

This application claims the benefit of priority from Italian Patent Application No. VR2012A000246 filed on Dec. 20, 2012 and from Italian Patent Application No. VR2013A000121 filed May 22, 2013, each of the contents of which are incorporated by reference.

TECHNICAL FIELD OF THE INVENTION

The present invention regards a device for feeding a fluid to a vessel to be filled, more particularly a device for inflating a tire to a pre-established pressure.

DESCRIPTION OF RELATED ART

In order to inflate tires to a specific pressure, many devices have been provided for up to now, including some equipped with an air supply line intercepted by a valve member, which is movable between an open or opening position in which it allows the passage of air between the supply line and the tire and a second position in which it obstructs such passage. More particularly, the valve member comprises or has ends slidably mounted in two cylinders, one larger and one smaller that can be fed by means of branch lines of the supply line. Suitably calibrated shut-off valves are then provided for intercepting the branch lines, which are intended to suitably control the air feed to the cylinders and hence the position of the valve member.

Naturally, the device is also equipped with a pedal or button for activating or allowing the feeding of the air to the supply line and means for reading or measuring the tire pressure.

With such devices, should the calibrated interception valves fail, particularly should they fail in open condition, it is understood that one would risk supplying too much air to the tire (should the operator not be careful during inflation and not release the pedal), ruining it if not making it explode.

Hence, since the shut-off valves are usually suitably calibrated such that the valve member is closed when the reading means are actuated, the inflation times are generally high, since there is an alternation of air supply and interruption thereof; this determines a low average inflation pressure.

DE102011017118A1, U.S. Pat. No. 5,429,167A, DE3246601A1, EP0365953A2 and GB1580240A teach devices for inflating a tire or for controlling the inflating pressure of a tire according to the prior art.

SUMMARY OF THE INVENTION

Therefore, the object of the present invention is to provide a device for feeding a fluid to a vessel to be filled, such as a device for inflating a tire to a pre-established pressure, which allows safely feeding the fluid, without running the risk of overfilling the vessel or tire, e. g. to an overly high pressure.

Another object of the present invention is to provide a device for feeding a fluid to a tank, such as a device for inflating a tire to a pre-established pressure, which is capable of feeding a fluid at pre-established pressure in a brief time and at a high average pressure.

Another object of the present invention is to provide a device for feeding as previously mentioned that is easy and cost effective to produce.

According to a first aspect of the present invention, a device for feeding a fluid to a vessel to be filled is provided, comprising:

a fluid inflow or inlet opening intended to be placed in fluid communication with a fluid source;

a distribution valve placed between the inlet opening and the vessel to be filled;

a fluid supply line between the distribution valve and the vessel to be filled;

at least one valve member intercepting the supply line and movable between at least one first position in which it allows the passage of fluid between the inlet opening and the vessel to be filled and a second position in which it obstructs such passage;

at least one compartment or cylinder operatively connected to the at least one valve member;

at least one branch line extending between the supply line and the at least one compartment or cylinder, the at least one branch line being intended to feed fluid to the at least one compartment or cylinder, so as to cause the movement of the valve member into at least one first or into the second position;

at least one shut-off valve placed on the at least one branch line;

means for actuating the at least one shut-off valve intended to move the at least one shut-off valve into respective operative positions;

at least one safety line extending from the supply line;

valve means for opening-closing the at least one safety line; and adjusting means for adjusting the position of the valve member, said adjusting means being in fluid communication with the at least one safety line and actuatable due to the fluid fed thereto.

Preferably, the adjusting means for adjusting the position of the valve member comprises intercepting means for intercepting the at least one branch line and displaceable between an opening position and a closing or partial closing position of the least one branch line.

Advantageously, the intercepting means comprises a valve component displaceable, for example, on one side, by means of the fluid supplied in the at least one safety line, and, on the other, by means of the fluid supplied in the at least one branch line.

Preferably, the adjusting means comprise actuator means in fluid communication with the at least one safety line and actuatable due to the fluid fed thereto so as to press or thrust the valve member into the second position.

Advantageously, the actuator means comprise an auxiliary cylinder or compartment that can be fed by means of the safety line and a thrust means operatively connected to the auxiliary cylinder or compartment and movable between a position of engagement of the valve member and a rest or non-engagement position of the valve member.

More advantageously, the opening-closing valve means are calibrated to a pressure value greater than that of the shut-off valve.

According to another aspect of the present invention, a device for feeding a fluid to a vessel to be filled is provided, comprising:

a fluid inflow or inlet opening intended to be placed in fluid communication with a fluid source;

a distribution valve placed between the inlet opening and the vessel to be filled;

a fluid supply line between the distribution valve and the vessel to be filled;

at least one valve member intercepting the supply line and movable between at least one first position in which it allows the passage of fluid between the inlet opening and the vessel to be filled and a second position in which it obstructs such passage;

at least one compartment or cylinder operatively connected to the at least one valve member;

at least one branch line being extending between the supply line and the at least one compartment or cylinder, the at least one branch line being intended to feed fluid to the at least one compartment or cylinder, so as to cause the movement of the valve member into at least one first or into the second position;

at least one shut-off valve placed on the at least one branch line;

means for actuating the at least one shut-off valve intended to move the at least one shut-off valve into respective operative positions;

at least one holding tank placed in fluid communication with the at least one compartment or cylinder.

Advantageously, the at least one holding tank is in fluid communication with a section of the at least one branch line intended to connect the shut-off valve and a respective compartment or cylinder.

Further aspects and advantages of the present invention will be clearer from the following detailed description of specific embodiments of a device, such description made with reference to the attached drawings.

BRIEF DESCRIPTION OF THE DRAWINGS

In the attached drawings, identical or similar parts or components were marked with the same reference numbers.

DETAILED DESCRIPTION OF PREFERRED EMBODIMENTS

Figure 1:
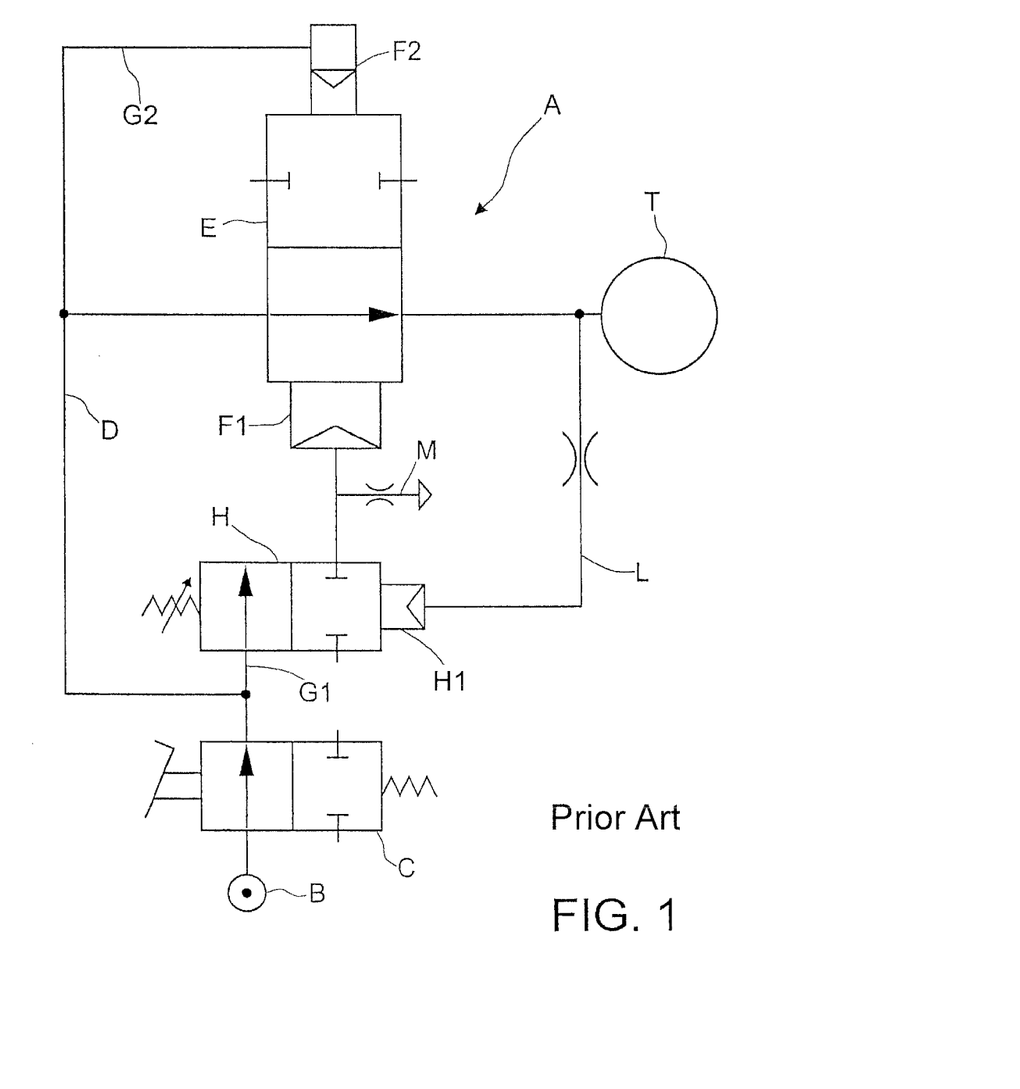
FIG. 1 schematically illustrates the components of a device according to the prior art.

First, with reference to FIG. 1, a device A is illustrated for inflating a tire T according to the prior art, which comprises a pressurized air insertion opening B in fluid communication with a pressurized air source, hence a shut-off valve C, e. g. controllable by an operator by means of a suitable pedal, and a line D for supplying the pressurized air to the tire T. On the supply line D, a valve E is provided for that can be moved transversely to the supply line D between a first position in which it allows the passage of fluid on the supply line D towards the tire T and a second position in which it obstructs such passage. The device then comprises two chambers or cylinders, one larger F1 and one smaller F2, each connected by a respective branch line G1, G2 from the supply line D. The two cylinders F1, F2 are arranged one opposite to the other with respect to the supply line D; in addition, a respective end of the valve E or of a stem or pin thereof is slidably mounted in each cylinder.

With one such structure, by feeding fluid to the larger cylinder F1 one determines a movement of the valve E towards the first position, whereas by feeding fluid to the smaller cylinder F2 one determines a movement of the valve E towards the second position; if fluid is fed to both cylinders F1, F2, due to the greater size (volume, cross section) of the cylinder F1, the valve E is brought into operative open position.

The branch line G1 for feeding fluid to the cylinder F1 is also intercepted by a valve adjustable in two positions H; one end of the valve H can be slidably mounted in a chamber H1 in fluid communication with the supply line D, by means of a duct L intended to feed pressurized air to the chamber H1, so as to move the valve H between a closed position and an open position. A section M for discharging into the atmosphere is then provided, which is in fluid communication with the branch line G1 between the valve E and the valve H.

The device A is then equipped or used in combination with means for reading or measuring the pressure within the tire, associated with display means, such that the operator can monitor, during inflation, the pressure within the tire T in order to evaluate if the same is either less inflated or at the desired pressure. For such purpose, the valve H is suitably calibrated such that during the reading or measuring operations, the pressure fed to the chamber H1 is such to close the valve H and hence close the valve E.

With one such device, the operator required to inflate a tire would actuate (e. g. using pedal) the valve C, so as to begin the supply, by means of the line D to the tire T. Simultaneously, the air would also traverse the branch lines G1, G2 as well as the duct L, determining the filling of the cylinders F1 and F2 and the movement of the valve E in open position. The valve H instead remains open until the pressure of the fluid fed to the chamber H1 is not such to move it into closed or closing position and it (valve H) then ensures that if the pressure in the supply line D, and thus in the duct L, is too high, and thus could ruin the tire T, the valve H is moved into closed position; this implies the emptying of the cylinder F1 (by means of the discharge section M) and the return of the valve E into closed position. For such purpose, the valve H is calibrated to the pressure that one wishes to obtain in the tire T.

During the inflation cycle, it may occur that the valve H is ruined, for example due to dirt or wear; particularly if such valve is locked in open position, this can imply an excessive increase of pressure in the tire, above all if the operator is not sufficiently careful to monitor the pressure of the tire T during inflation.

Moreover, the alternation of air feeding steps with measuring/reading steps—considering that (as stated above) during the reading steps the valve H is usually closed—implies a very slow inflation time and an average pressure (during the entire process) even much lower than the air supply pressure. See FIG. 4 in particular to be addressed further in detail hereinafter.

Figure 2:
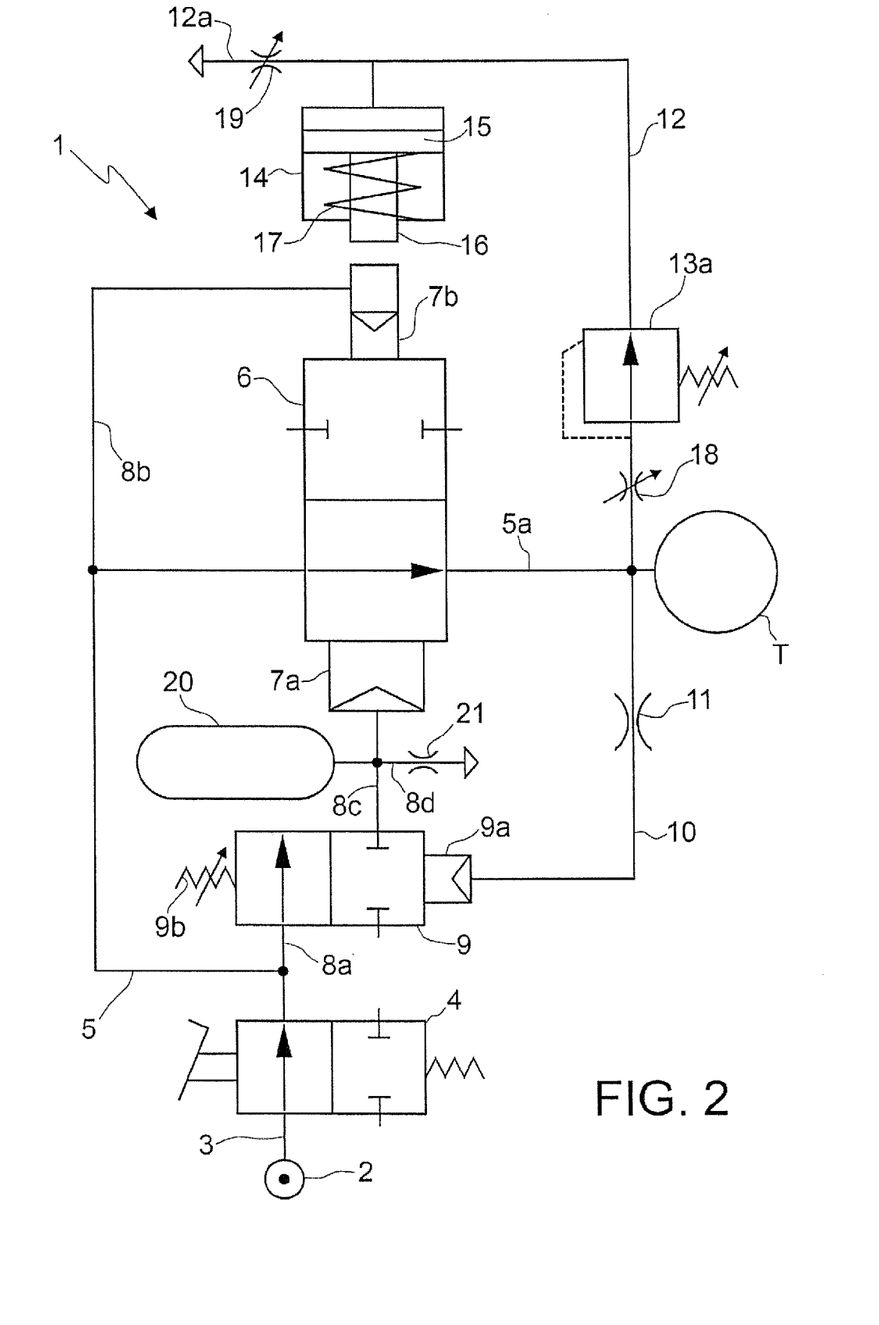
FIG. 2 schematically illustrates the components of a device according to the present invention.
Figure 3:
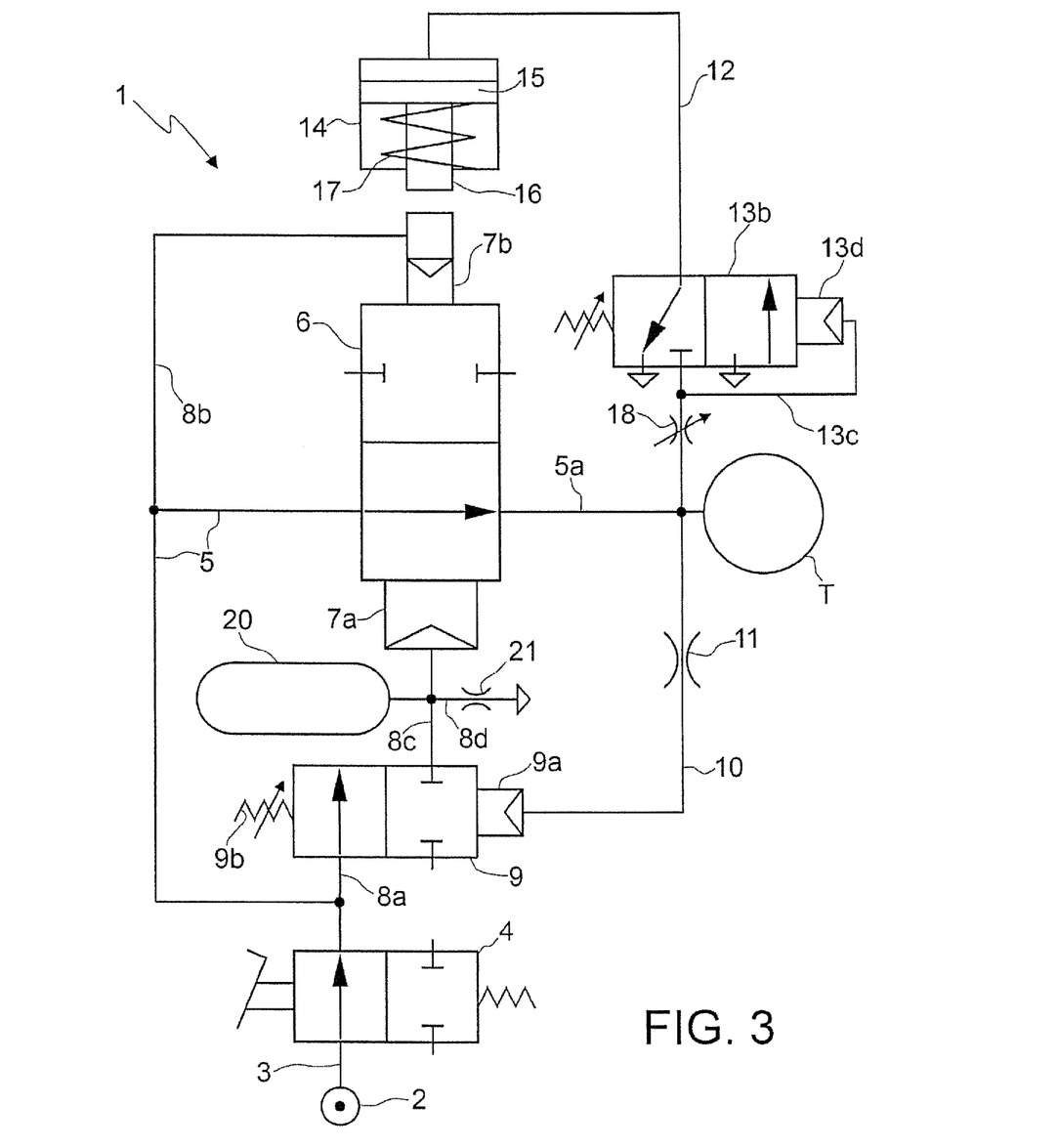
FIG. 3 schematically illustrates the components of a device in accordance with another embodiment according to the present invention.

With reference to FIGS. 2 and 3, a device 1 according to the present invention is illustrated, intended to feed a fluid to a vessel or container to be filled, for example at a pre-established pressure, preferably a device for inflating a tire T.

The device first of all comprises a fluid inflow or inlet opening 2 (e. g. pressurized air), which is intended to be placed in fluid communication with a fluid source, e. g. a compressor or the like, not illustrated in the drawings.

The inlet or inflow opening 2 is in fluid communication by means of a duct 3 with a distribution valve 4, e. g. a valve with two positions, placed between the inlet opening 2 and the container T.

The device 1 then comprises a fluid supply line 5 between the distribution valve 4 and the container T to be filled (tire), as well as at least one valve member 6, e. g. a valve with two positions, intercepting the supply line 5 and movable, e. g. transversely to the supply line 5, between a first position, in which it allows the passage of fluid between the inlet opening 2 (and hence the fluid source) and the container to be filled T and a second position in which it obstructs such passage.

The device then comprises one or preferably two compartments or cylinders 7a, 7b operatively connected to the valve member 6, and also one or more branch lines 8a, 8b which extend between the supply line 5 and the compartment(s) 7a, 7b and which are intended to feed a fluid to a respective compartment or cylinder 7a, 7b, so as to determine the movement of the valve member 6 into the first or second position.

More particularly, the device 1 delimits two cylinders or compartments 7a, 7b; a respective end of the valve member 6 or better yet a stem or pin thereof is slidably mounted in each cylinder or compartment.

Preferably, two cylinders or compartments 7a, 7b are provided for, one larger 7a and the other smaller 7b, arranged one opposite to the other with respect to the supply line 5. The cylinders are placed in a manner such that by filling or feeding fluid to the larger cylinder 7a, the valve member 6 is thrust towards the open or opening position, whereas by filling or feeding fluid to the smaller cylinder 7b, the valve member 6 is thrust towards the second closed or closing position; if both cylinders 7a, 7b are fed, due to the greater size of the cylinder 7a, the valve member 6 is brought into open operative position.

On the branch line 8a for feeding fluid to the larger cylinder 7a, a shut-off valve 9 is then provided for, e.g. calibrated or calibratable and movable, for example as will be stated below into respective operative positions by means of actuation means, which can comprise, e. g. a branch duct 10, which on one side is in fluid communication with a chamber 9a operatively connected to the valve 9, and on the other side with the supply line 5.

For such purpose, one end of the shut-off valve 9 (or a stem or pin of the same) can be slidably mounted in the chamber 9a delimited in the body of the device 1 and then thrust as a function of the fluid fed into the chamber 9a.

Preferably, the branch duct 10 extends from a section 5a of the supply line 5 placed between the valve member 6 and the container to be filled T. If desired, a flow rate reducer 11 can be provided on the branch duct 10.

With such structure, when a fluid (pressurized air) is conveyed, starting from the supply line 5, in the branch duct 10, the latter feeds the fluid into the chamber 9a and causes the movement of the shut-off valve 9, preferably in closed condition against the action of elastic loading means, e. g. a spring 9b, for example calibrated or calibratable.

Usually, the shut-off valve is calibrated to the pressure that one wishes to obtain in the container or vessel to be filled.

The device then comprises one or more safety lines 12 which extend from the supply line 5, preferably from the section 5a, e. g. starting from a point at the inlet end of the branch duct 10.

Valve means are then provided for opening-closing 13a, 13b the safety line 12; adjusting means are also provided for adjusting the position of the valve member 6, which adjusting means are in fluid communication with the safety line 12 and are actuatable due to the fluid supplied thereto. According to the embodiment shown on FIGS. 2 and 3, the adjusting means comprise actuator means 14 in fluid communication and hence feedable from the safety line 12 so as to press or thrust the valve member 6 into the second position.

The actuator means 14 preferably comprise:

an auxiliary cylinder or compartment 15 that can be fed by means of the safety line 12;

a thrust means or shank 16 intended to press or thrust or pull, directly or by means of interposition of another component, one end of the valve member 6; the thrust means or shank is operatively connected to the auxiliary cylinder 16, e. g. slidably mounted in the auxiliary cylinder 16, between a position of engagement of the valve member 6 and a rest or non-engagement position of the valve member 6.

Preferably, also elastic loading or position maintenance means 17 are provided for the thrust means or shank 16.

The opening-closing valve means can comprise a calibrated or calibratable spring 13a (see FIG. 2) or, if desired, a valve with at least two positions 13b, an open position and an atmosphere discharge position (see FIG. 3). In this second case, the valve 13b can comprise a feed duct 13c intended to feed fluid from the safety line 12, upstream of the valve 13b, to a secondary cylinder 13d operatively connected to the valve 13b, so as to open such valve 13b. To this regard, one end of the opening-closing valve 13b (or a stem or a pin of the same) can be slidably mounted within the cylinder 13d delimited in the body of the device 1.

The device can then include a calibratable flow rate reducer component 18, between the supply line 5a and the opening-closing valve means 13a, 13b.

The safety line can also have a discharge section 12a (see FIG. 2) downstream of the feed section of the actuator means 14, such section 12a can be intercepted by a flow rate reducer component 19, also for example calibrated or calibratable.

Figure 4:
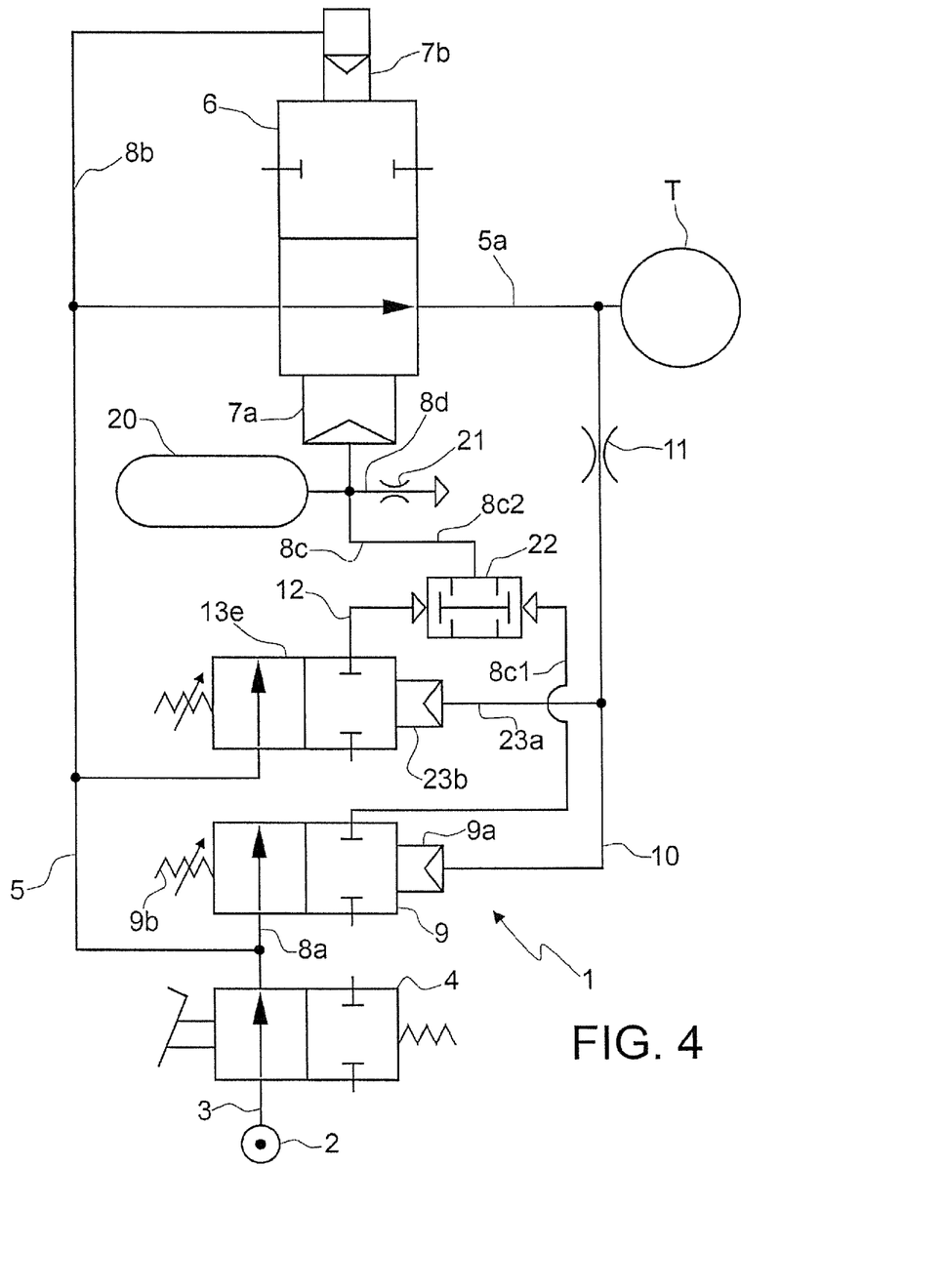
FIG. 4 schematically illustrates the components of a device according to a further embodiment.

According to a variant, see FIG. 4, the adjusting means for adjusting the position of the valve member 6 comprises intercepting means 22 for intercepting the branch line/s 8a and/or 8b, which intercepting means are displaceable between a first position, for example an open or opening position of the respective branch line 8a or 8b and a second position, for example a closing or partially closing position, i. e. a position at which the open section of the branch line 8a or 8b is lower than the open section of the branch line 8a or 8b with intercepting means in the first position. To this regard, the intercepting means can include a valve component 22, e. g. calibrated or calibratable and displaceable by means of the fluid fed into the safety line 12, if desired, on one side, by means of the fluid supplied in the safety line 12, and, on the other, by means of the fluid fed into the branch line 8a or 8b. In the latter case, if desired, the valve component 22 closes or reduces the passage section of the branch line 8a or 8b, when the fluid flow rate fed thereto by the safety line 12 is lower than a predetermined value or lower than the fluid flow rate fed thereto by the respective branch line 8a or 8b.

Control means 23a, 23b of the opening-closing valve means 13e can also be provided for, which control means are designed to displace or move the opening-closing valve means 13e in respective operative positions. Such control means can include a chamber 23b operatively connected to the opening-closing valve means 13e and a feeding duct 23a between the supply line 5, preferably between the section 5a and the chamber 23b, or between the branch duct 10 and the chamber 23b, the feeding duct 23a being designed to fed fluid to the opening-closing valve means 13e, thereby displacing them in respective operative positions. Preferably, a respective end of the opening-closing valve means 13e or a component thereof, such as a stem or pin thereof is slidingly mounted in the chamber 23b.

To this regard, the adjusting means can include a device so called AND or for carrying out the logic/pneumatic AND function. As it is known, the AND function can be obtained in a number of manner, e.g. through a multi-pressure valve, for example a two-pressure valve, as the valve component 22, or through two distributors connected in series.

If a valve component 22 is used, it, as above-said, is displaceable in respective operative positions owing to the intake therein of fluid supplied by means of the safety line 12, and, if desired, by means of the branch line 8a also. If, for any reason, the supply of fluid (for example air) in the safety line 12 is interrupted or substantially reduced (for example owing to the displacement in closing or partly closing position of the valve means 13e), while fluid is supplied through the branch line 8a with a pressure higher than the safety line 12, the valve component 22 is, preferably, displaced in closing operative position, whereas it (the valve component) is displaced in opening operative position when fluid is supplied thereto both by means of the safety line 12 and by means of the respective branch line 8a.

Of course, in place of the two-pressure valve component 22, calibrated valves for intercepting the branch line 8a and in fluid communication with the safety line 12 can be used, which calibrated valves can be, for example, closed when the fluid supply in the safety line 12 is interrupted or reduced, since, for example, the opening-closing valve means 13e are closed or partly closed.

According to the now described variant, the valve means 13e can then include a valve connected in parallel to the intercepting valve 9, and, preferably, such valves are identical, e.g. are calibrated or calibratable two position valves.

The branch line 8a instead, according to the embodiments of FIGS. 2 and 3 would include, besides a connecting duct between the supply line 5 and the intercepting valve 9, a section 8c designed to connect the intercepting valve 9 and a respective compartment or cylinder 7a.

According to the embodiment of FIG. 4, instead, the duct 8c would include a branch 8c1 designed to connect the intercepting valve 9 and the valve component 22 and a branch 8c2 designed to connect the valve component 22 and a respective compartment or cylinder 7a. The branch 8c2 can be fed with the fluid supplied through the branch 8c1 only, or, according to a variant, both by means of the branch 8c1 and by the safety line 12, in which case the valve component 22 can be structured in such a way as to put, when it is located in one or more opening operative positions, the branch 8c2 in fluid communication with the branch 8c1 only or, according to a variant, both with the branch 8c1 and with the safety line 12.

As an alternative or in combination with the safety line equipped with the above-described components, a device according to the present invention can include at least one holding tank 20 which is placed in fluid communication with a compartment or cylinder, according to the embodiment illustrated in the Figures, with the compartment or larger cylinder 7a. Preferably, the holding tank is placed in fluid communication with a section 8c of the branch line 8a, such section being intended to connect the shut-off valve 9 and a respective compartment or cylinder 7a.

A device according to the present invention can also comprise a discharge section 8d, e.g. discharging into the atmosphere, which can be intercepted by a flow rate reducer 21. The discharge section 8d is preferably in fluid communication with the section 8c.

A device according to the present invention can then include means for feeding fluid to the inlet or inflow end 2 and means for measuring the pressure value in the container to be filled.

With one such device, when required to fill a vessel under pressure, e.g. if required to inflate a tire, the operator would connect the opening 2 to a fluid source, e.g. a compressor, then he would actuate, if desired by means of pedal, the distribution valve 4 by opening it; this would cause the supply of the fluid inside the supply line 5, into the branch lines 8a and 8b and cylinders 7a and 7b, then the opening (if not already in open position) of the valve member 6, which would lead to the inflow of the fluid into the container (tire) T as well as into the branch duct 10.

The operator could thus monitor the increase of pressure inside the container T, which would gradually increase until the desired value is reached; at that point, the operator, by releasing the pedal, would interrupt the fluid supply, closing the distribution valve 4.

During the supply, if the pressure in the supply line 5 increases too much, the fluid passes through the duct 10 and then fills the chamber 9a, moving the shut-off valve 9 into closed conditions, thus interrupting the supply of fluid to the cylinder 7a and then closing the valve member 6 due to the fluid fed into the cylinder 7b.

Should the shut-off valve 9 fail and the operator not be careful, one would risk an overfilling or excessive inflation of the container (tire), as stated above.

For such purpose, there is provided for a safety line 12 wherein when the pressure of the fluid in the section 5a exceeds a pre-established value, the valve means 13a, 13b (suitably calibrated to a pressure value greater than that of the shut-off valve 9) are opened and the fluid begins to flow in the safety line 12 up to the actuator means 14; the latter are thus actuated by engaging the valve member and moving it into the second position, thus interrupting the supply of fluid to the vessel T.

Due to the safety line, it is therefore possible to ensure a safe filling of the container T or inflation of the tire; with the exceeding of a pre-established pressure in the section 5a (downstream of the container T), the valve 13a, 13b would open, thus moving the valve member 6 into closed or obstruction position (through the actuator means 14).

In the case in which, instead, as adjusting means would be used an intercepting device or valve component 22, if the intercepting valve 9 should break in open position, when the fluid pressure in the supply line 5 (and thus in the duct 5a and in the branch duct 10) should exceed a predetermine value, this would cause a closure (by means of the fluid supplied in the chamber 23b through the feeding duct 23a) of the opening-closing valve 13e and thus the closure of the valve component 22. Therefore, in such case too, the valve member 6 would be closed and it would not be run the risk to ruin the tire even in the case in which the operator should be distracted.

With regard to the function of the tank 20, as has been described above, a device according to the present invention is provided or used in combination with means for reading or measuring the pressure in the tire, associated with display means, such that the operator monitors, during inflation, the pressure in the tire T in order to evaluate if the same is either less inflated or at the desired pressure.

For such purpose, the device is usually dimensioned and calibrated in a manner such that during the inflation, the pressure in the duct 10 reaches values such to cyclically close the shut-off valve 9 and that such phases or periods of closure of the shut-off valve correspond with the phases or period of reading or measurement.

Therefore, during the reading and measurement steps, the pressure in the duct 10 is such to overcome the force of the calibrated spring 9b and hence to close the shut-off valve 9; in a device according to the prior art, this would involve the interruption of the feeding of the fluid to the main cylinder 7a and hence the movement of the valve member 6 into closed position.

Figure 5:
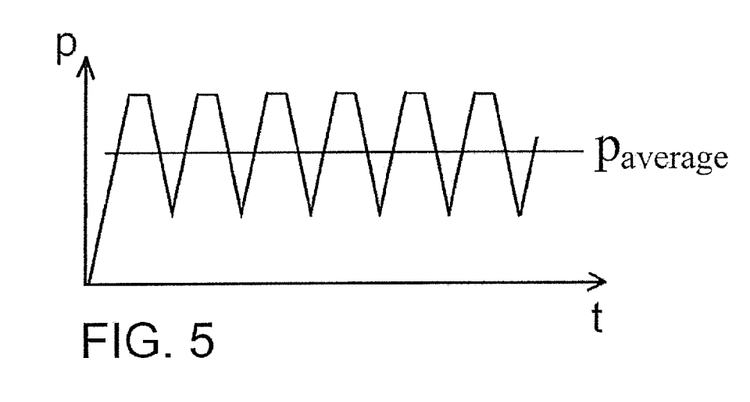
FIGS. 5 and 6 illustrate graphs of the inflation pressure as a function of time, respectively with a device according to the prior art and with a device in accordance with the present invention.

In a conventional device (see in particular FIG. 5), this implies that the pressure in the section 5a of the supply line over time has values that vary between a maximum pressure value (which is dictated by the fluid source and by the load losses) and a minimum pressure value (determined by the reduction of the maximum pressure during the reading time), with brief time intervals in which the pressure is at the maximum value, such that the average pressure for inflating or feeding the fluid to the vessel is much lower than the maximum value.

Due to the presence of the holding tank 20, when—during reading or measurement—the shut-off valve 9 is closed, the air previously accumulated in the holding tank would flow into the larger cylinder 7a; this would ensure an extension of the opening time of the valve member 6 and hence a maintenance of the higher pressure in the section 5a for a greater time with respect to a device lacking holding tank.

Figure 6:
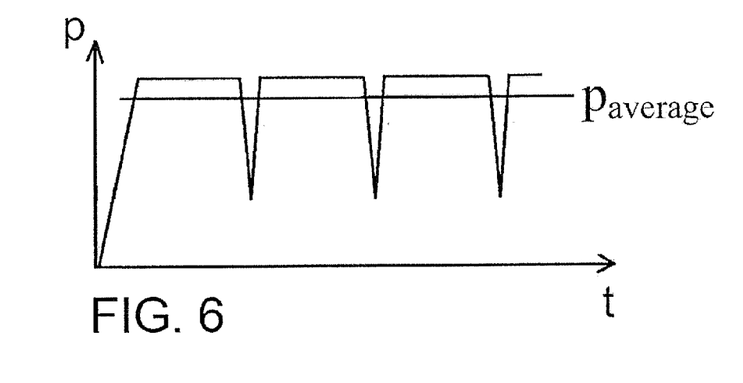

FIG. 6 illustrates the progression of the pressure in the section 5a by using a device according to the present invention equipped with holding tank; as can be understood, with a device according to the present invention, the higher pressure in the section 5a is maintained for greater time intervals and hence the average feed or inflation pressure is higher, nearly corresponding to the higher pressure; this implies filling times of the container or inflation of the tire that are lower than those for conventional devices, while maintaining quick reading times.

The holding tank, in the case of a device for inflating a tire to a pressure of 1 bar, can have size equal to about 25 cc; in such a manner, the increase of pressure in the tire due to the holding tank (when the shut-off valve is closed) is not such to damage the tire, if the same was already at the inflation pressure, before the action of the fluid in the holding tank.

The above-described device is susceptible to numerous modifications and variants falling within the protective scope defined by the claims.

The invention claimed is:

1. A device for feeding a fluid to a vessel to be filled, comprising:
   a fluid inflow or inlet opening intended to be placed in fluid communication with a fluid source;
   a distribution valve placed between said inlet opening and said vessel to be filled;
   a fluid supply line between said distribution valve and said vessel to be filled;
   at least one valve member intercepting said supply line and movable between at least one first position in which it allows the passage of fluid between said inlet opening and said vessel to be filled and a second position in which it obstructs such passage;
   at least one compartment or cylinder operatively connected to said at least one valve member;
   at least one branch line extending between said supply line and said at least one compartment or cylinder, said at least one branch line being intended to feed fluid to said at least one compartment or cylinder, so as to cause the movement of said valve member into said at least one first or into said second position;
   at least one shut-off valve placed on said at least one branch line;
   means for actuating said at least one shut-off valve intended to move said at least one shut-off valve into respective operative positions;
   at least one safety line extending from said supply line;
   valve means for opening-closing said at least one safety line; and
   adjusting means for adjusting the position of said valve member, said adjusting means being in fluid communication with said at least one safety line and adjusting the position of the valve member as a function of the fluid fed to the adjusting means by means of the at least one safety line.

2. A device as claimed in claim 1, wherein said adjusting means for adjusting the position of said valve member comprises intercepting means of said at least one branch line displaceable between an opening position and a closing or partial closing position of said at least one branch line.

3. A device as claimed in claim 2, wherein said intercepting means comprise a valve component.

4. A device as claimed in claim 3, wherein said valve component is displaceable, on one side, by means of the fluid fed into said at least one safety line, and, on the other, by means of the fluid fed into said at least one branch line.

5. A device as claimed in claim 3, wherein said valve component closes said at least one branch line when the fluid flow rate supplied thereto by said at least one safety line is lower than a predetermined value or lower than the fluid flow rate supplied thereto by said at least one branch line.

6. A device as claimed in claim 1, comprising control means of said opening-closing valve means designed to displace said opening-closing valve means in respective operative positions.

7. A device as claimed in claim 6, wherein said control means of said opening-closing valve means comprise a feeding duct between said supply line and a chamber operatively connected to said opening-closing valve means, said feeding duct being designed to supply fluid to said opening-closing valve means, thereby displacing said opening-closing valve means in respective operative positions.

8. A device as claimed in claim 1, wherein said adjusting means comprises actuator means in fluid communication with said at least one safety line and actuatable due to the fluid fed thereto so as to press or thrust or pull said valve member into said second position.

9. A device according to claim 8, wherein said actuator means comprise an auxiliary cylinder or compartment that can be fed by means of said safety line and a thrust means operatively connected to said auxiliary cylinder or compartment and movable between a position of engagement of the valve member and a rest or non-engagement position of said valve member.

10. A device according to claim 8, wherein said at least one safety line has a discharge section downstream of the feed section of said actuator means.

11. A device according to claim 1, wherein said opening-closing valve means are calibratable.

12. A device according to claim 11, wherein said opening-closing valve means are calibrated to a pressure value greater than that of said shut-off valve.

13. A device according to claim 1, comprising at least one flow rate reducer component between said supply line and said opening-closing valve means.

14. A device according to claim 1, wherein said at least one safety line extends from a section of said supply line between said valve member and said vessel to be filled.

15. A device according to claim 1, comprising:
at least one holding tank placed in fluid communication with said at least one compartment or cylinder.

16. A device according to claim 15, wherein said at least one holding tank is in fluid communication with a section of said at least one branch line intended to connect said shut-off valve and a respective compartment or cylinder.

17. A device according to claim 15, wherein said at least one compartment or cylinder includes two cylinders or compartments, one cylinder larger than the other, wherein the two cylinders are placed in a manner such that by filling or feeding fluid to said larger cylinder, said at least one valve member is thrust towards the open position, whereas by filling or feeding fluid to said smaller cylinder, said at least one valve member is thrust towards the second closed position, and in that said holding tank is in fluid communication with said larger cylinder.

18. A device according to claim 1, comprising a discharge section in fluid communication with a section of said branch line which is intended to connect said shut-off valve and a respective compartment or cylinder.

19. A device according to claim 1, wherein said means for actuating said at least one shut-off valve comprise a branch duct between said supply line and a chamber operatively connected with said at least one shut-off valve, said branch duct being intended to convey fluid to said at least one shut-off valve so as to move it into respective operative positions.

20. A device according to claim 19, wherein said branch duct extends from a section of said supply line between said valve member and said vessel to be filled.

21. A device according to claim 1, wherein said at least one compartment or cylinder includes at least one pair of compartments or cylinders, and in that it comprises at least two branch lines, each extending between said supply line and a respective compartment or cylinder.

22. A device according to claim 1, comprising a device for inflating a tire.

23. A device for feeding a fluid to a vessel to be filled, comprising:
a fluid inflow or inlet opening intended to be placed in fluid communication with a fluid source;
a distribution valve placed between said inlet opening and said vessel to be filled;
a fluid supply line between said distribution valve and said vessel to be filled;
at least one valve member intercepting said supply line and movable between at least one first position in which it allows the passage of fluid between said inlet opening and said vessel to be filled and a second position in which it obstructs such passage;
at least one compartment or cylinder operatively connected to said at least one valve member;
at least one branch line extending between said supply line and said at least one compartment or cylinder, said at least one branch line being intended to feed fluid to said at least one compartment or cylinder, so as to cause the movement of said valve member in said at least one first or in said second position;
at least one shut-off valve placed on said at least one branch line;
means for actuating said at least one shut-off valve intended to move said at least one shut-off valve into respective operative positions; and
at least one holding tank placed in fluid communication with said at least one compartment or cylinder,
wherein said at least one compartment or cylinder includes two cylinders or compartments, one cylinder larger than the other, wherein the two cylinders are placed in a manner such that by filling or feeding fluid to said larger cylinder, said at least one valve member is thrust towards the open position, whereas by filling or feeding fluid to said smaller cylinder, said at least one valve member is thrust towards the second closed position, and in that said holding tank is in fluid communication with said larger cylinder.

24. A device according to claim 23, wherein said at least one holding tank is in fluid communication with a section of said at least one branch line intended to connect said shut-off valve and a respective compartment or cylinder.

25. A device for feeding a fluid to a vessel to be filled, comprising:
a fluid inflow or inlet opening intended to be placed in fluid communication with a fluid source;
a distribution valve placed between said inlet opening and said vessel to be filled;
a fluid supply line between said distribution valve and said vessel to be filled;
at least one valve member intercepting said supply line and movable between at least one first position in which it allows the passage of fluid between said inlet opening and said vessel to be filled and a second position in which it obstructs such passage;
at least one compartment or cylinder operatively connected to said at least one valve member;
at least one branch line extending between said supply line and said at least one compartment or cylinder, said at least one branch line being intended to feed fluid to said at least one compartment or cylinder, so as to cause the movement of said valve member in said at least one first or in said second position;
at least one shut-off valve placed on said at least one branch line;
means for actuating said at least one shut-off valve intended to move said at least one shut-off valve into respective operative positions; and
at least one holding tank placed in fluid communication with said at least one compartment or cylinder, wherein the holding tank ensures that when, during reading or measurement, the at least one shut-off valve is closed, air previously accumulated in the holding tank flows into at least one of the at least one cylinder or the valve member so as to increase the opening time of the valve member and a maintenance of the higher pressure in a section of the fluid supply line.

* * * * *